No. 884,331. PATENTED APR. 7, 1908.
M. HARDSOCG.
PNEUMATIC AND OTHER DRILLS.
APPLICATION FILED MAR. 2, 1907.

Witnesses
Inventor:
Martin Hardsocg

UNITED STATES PATENT OFFICE.

MARTIN HARDSOCG, OF OTTUMWA, IOWA.

PNEUMATIC AND OTHER DRILLS.

No. 884,331.　　　　Specification of Letters Patent.　　　　Patented April 7, 1908.

Original application filed February 20, 1906, Serial No. 302,049. Divided and this application filed March 2, 1907.
Serial No. 360,269.

*To all whom it may concern:*

Be it known that I, MARTIN HARDSOCG, a citizen of the United States, residing at Ottumwa, in the county of Wapello and State of Iowa, have invented certain new and useful Improvements in Pneumatic and other Drills, of which the following is a specification, the same being a division of my application, Serial No. 302,049, filed February 20, 1906.

The use of pneumatic drills is attended with the production of fine dust to a greater or less extent, which dust is thrown off by the cutting of the drill and accumulates in the bit of the drill, interfering with the cutting operation, and in addition, this fine dust or particles, impregnates the air and is objectionable for that reason.

The object of the present invention is to construct a drill with a shank or stem by which the dust or fine particles will be removed or taken away and not interfere with the operation of the cutting, or escape so as to impregnate the air.

The invention consists in the features of construction and combinations of parts hereinafter described and claimed.

Figure 1:
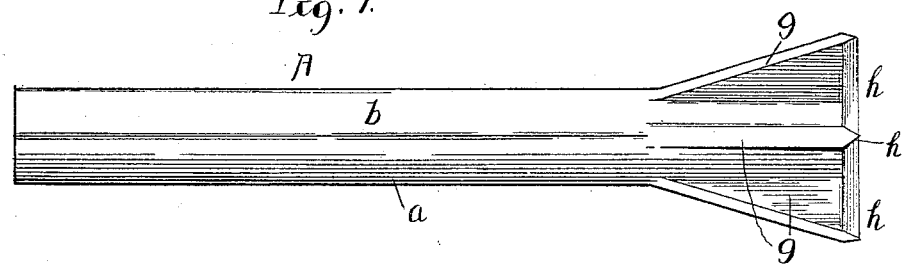
Figure 2:
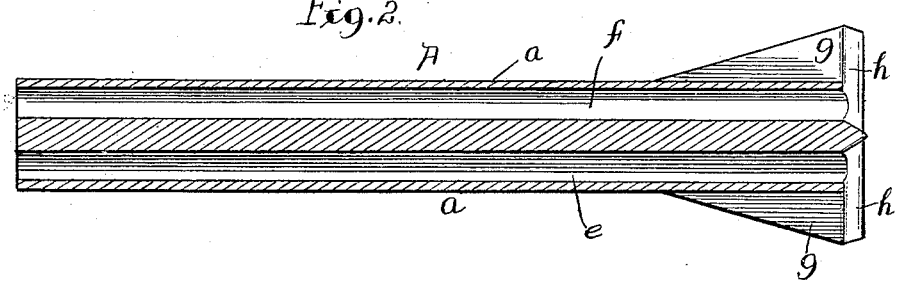
Figure 3:
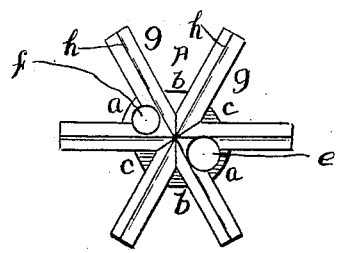

In the drawings Figure 1 is a side elevation of a drill having six bits or blades each with cutting edge; Fig. 2 a sectional elevation of the drill shown in Fig. 1; Fig. 3 an end elevation of the drill of Figs. 1 and 2, showing the six bits or cutters; and Fig. 4 a cross section through the shank or stem of the drill of Figs. 1 and 2.

Figure 4:
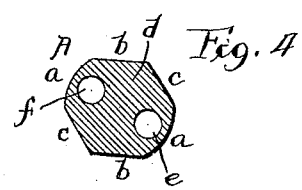

The drill shown has a shank or stem A of a hexagonal form in cross section, with an exterior having opposite curved faces $a$, opposite plain or flat faces $b$, and opposite plain or flat faces $c$, and the shank or stem has a center or body D, and the curved or flat faces, where joined, form six corners, as clearly shown in Fig. 4. The curved and flat faces of the shank or stem are of a shape to enable the cutting end of the drill to be upset to form six bits or blades $g$ extending laterally out from the longitudinal corners of the shank, as shown in Figs. 1, 2 and 3.

The center or body $d$ has extending longitudinally therethrough a hole or passage $e$ and a hole or passage $f$, both furnishing a clear passage or conduit from end to end of the shank or stem, with both passages, at the terminal or cutting end of the drill, extending partly into two adjoining bits or blades, as shown in Figs. 2 and 3.

The hole or passage $e$ furnishes a conduit by which air or other cooling medium can be supplied to the cutting end of the drill, as required during the cutting operation. The hole or passage $f$ furnishes a conduit through the stem from end to end by which the produced dust and fine particles from the cutting can be withdrawn from the cutting end of the drill and discharged at the rear end of the shank or stem, by the pressure of the supplied air or other medium from the acting end of the drill, which air or other medium acts to force and carry back with it the fine dust and fine particles, from the bits or blades and keeping the cutting end of the drill perfectly clear and free from becoming clogged or inoperative. The fine dust or fine particles carried through the passage or conduit $f$ and discharged at the rear end of the shank or stem of the drill is discharged into the atmosphere, at a point where it will not produce damage or injurious effects.

The cutting end of the shank or stem is upset and spread outwardly in line with the corners joining the flat faces $b$ and $c$ with the curved faces $a$ and with each other, so as to form, at the longitudinal corners of the shank, the bits or blades, one bit or blade for each of the six corners and tapered from the body of the shank or stem, as shown in Figs. 1 and 2, and each bit or blade $g$ has a cutting edge $h$ for performing the cutting operation. The supply hole or conduit $e$ for the air or other medium opens between two adjoining bits or blades, as shown in Fig. 3, so that air or other medium will be properly delivered to the cutting edges of the bits or blades, and the discharge hole or conduit $f$ for withdrawing the air or other medium and the fine dust and particles commingled therewith likewise opens between two adjoining blades, as shown in Fig. 4, so that the air or other medium, under pressure, will flow back through the passage or conduit and carry with it the fine dust and fine particles for discharge at the rear end of the shank or stem.

The shank or stem of the drill, with its body and its two oppositely curved faces and its four oppositely arranged flat straight faces for its exterior, furnishes a shank or stem adapted to have formed on its acting end six bits or blades one bit or blade projecting out from each corner of the shank or stem, each with a cutting edge, and this without the necessity of welding or otherwise attaching the bits or blades.

What I claim as new and desire to secure by Letters Patent is:

1. A drill for a pneumatic tool, having a shank of hexagonal shape in cross section, said shank having an exterior consisting of two curved opposite faces and four flat faces, with the flat faces arranged in diagonal opposing relation, the two curved and the four flat faces forming six corners, and the six corners of the shank upset at one end to produce six bits or blades, each with a cutting edge, one bit or blade in radial line with each corner, the shank having two longitudinal passages extending therethrough to the cutting end and parallel with the curved exterior faces, substantially as described.

2. A drill for a pneumatic tool, having a shank of hexagonal shape in cross section, said shank having an exterior consisting of two curved opposite faces and four flat faces, with the flat faces arranged in diagonal and opposing relation, the two curved and the four flat faces forming six corners, and the six corners of the shank upset at one end to produce six bits or blades each with a cutting edge, one bit or blade in radial line with each corner, the shank having two longitudinal passages extending therethrough to the cutting end and parallel with the curved exterior faces, each longitudinal passage opening between the two adjoining bits or blades, substantially as described.

3. A drill for a pneumatic tool, having a shank of a hexagonal shape in cross section, the shank having an exterior consisting of curved and flat faces arranged in pairs, the two curved faces forming one pair and the four flat faces forming two pairs, and the third pair of faces forming six corners to produce six bits or blades, one bit or blade in radial line with each corner and each bit or blade having a cutting edge, and the shank having two longitudinal passages extending therethrough to the cutting end, substantially as described.

MARTIN HARDSOCG.

Witnesses:
W. A. WORK,
FRED BOWLES.